United States Patent [19]

Berglund et al.

[11] Patent Number: 4,912,488

[45] Date of Patent: Mar. 27, 1990

[54] CAMERA WITH IMAGE INPUT FROM LINEAR ARRAY OF ELECTRIC-TO-LIGHT TRANSDUCERS

[75] Inventors: Robert S. Berglund, Hudson, Wis.; Earl K. Hoyne, Fridley, Minn.

[73] Assignee: Minnesota Mining and Manufacturing Company, St. Paul, Minn.

[21] Appl. No.: 214,534

[22] Filed: Jul. 1, 1988

[51] Int. Cl.⁴ ............................................. G01D 15/14
[52] U.S. Cl. ................................ 346/108; 346/107 R
[58] Field of Search .................. 346/107 R, 108, 160, 346/110

[56] References Cited

U.S. PATENT DOCUMENTS 3,539,257 11/1970 Hoyne et al. ........................ 355/65
4,342,504 8/1982 Ebner ............................... 346/107 R
4,435,064 3/1984 Tsukada .......................... 346/107 R Primary Examiner—Bruce A. Reynolds
Assistant Examiner—Mark Reinhart
Attorney, Agent, or Firm—Donald M. Sell; Terryl K. Qualey; Robert L. Marben

[57] ABSTRACT

Camera apparatus including a housing within which an exposure station is provided with a film handling means provided at the exposure station for supporting and disposing a strip of film and a linear array of electric-to-light transducers disposed to direct light from the array to the strip of film as it is moved past the exposure station. Another embodiment employs two linear arrays of electric-to-light transducers which are used to expose separate areas of the film as it is moved past the exposure station.

4 Claims, 5 Drawing Sheets

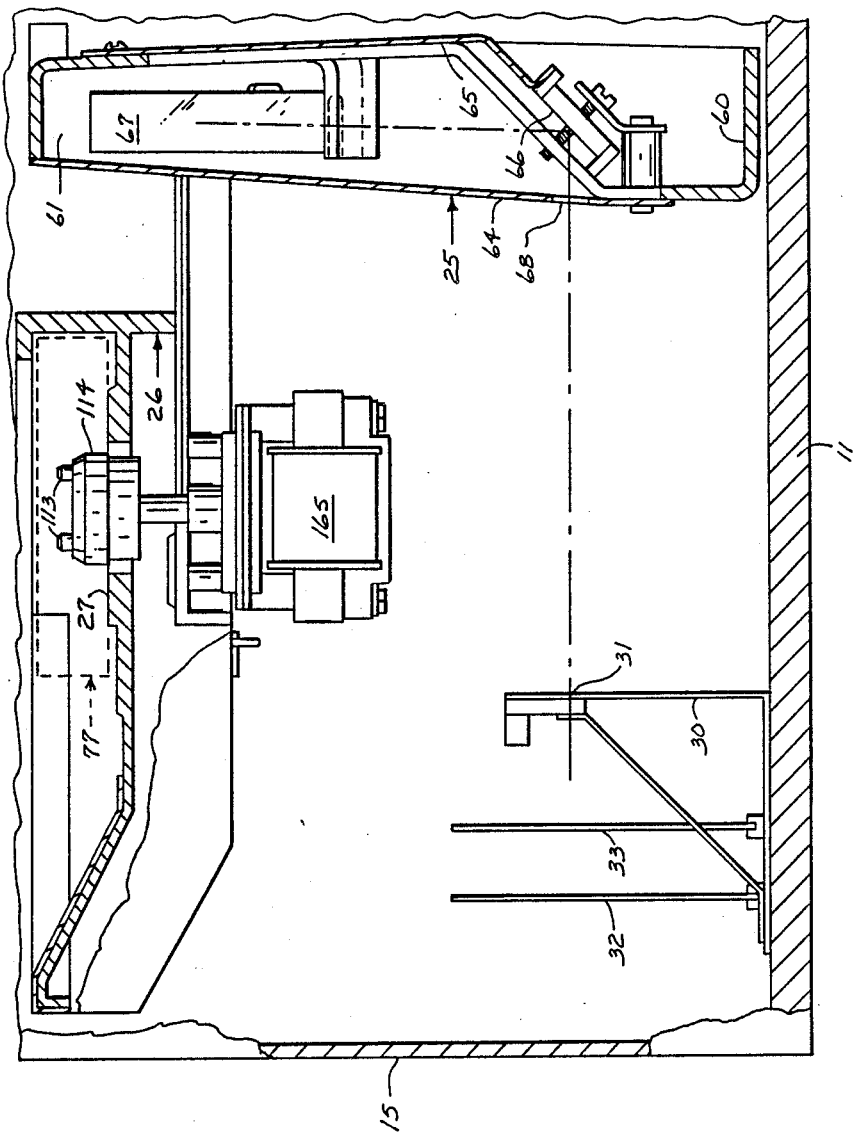

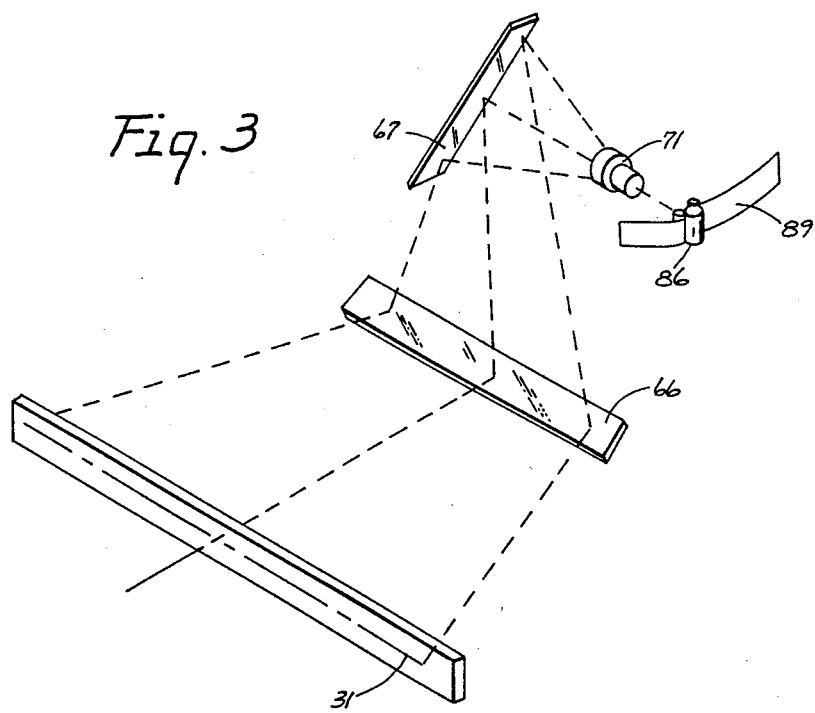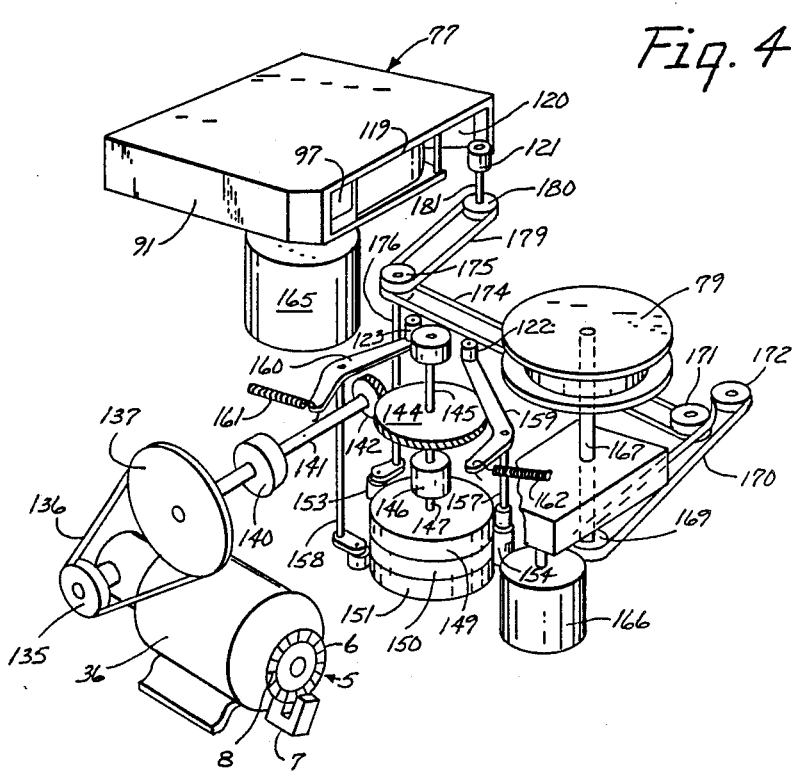

CAMERA WITH IMAGE INPUT FROM LINEAR ARRAY OF ELECTRIC-TO-LIGHT TRANSDUCERS

BACKGROUND OF THE INVENTION

The invention presented herein relates to the storage of information on film and, in articular, to a camera wherein the film is exposed on a line-by-line basis and the light image for each line is provided by a line array of electric-to-light transducers.

The optical disc is recognized as an economical and convenient storage media for the storage of images in a bit map format. However, unlike film, the optical disc provides a relatively short storage life for information so it is not usable for archival storage. There is a need, therefore, for apparatus which can efficiently and effectively receive bit map information from an optical disc and record such information on film to provide for archival storage. Such apparatus would be usable also for receiving bit information from any storage media storing images in bit map format to store such images on film.

SUMMARY OF THE INVENTION

The invention presented herein provides a means by which information provide in bit map format can be used to expose a film to provide for archival storage of the information. The invention is embodied in a camera including a housing, a linear array of electric-to-light transducers positioned within the housing; means within the housing defining an exposure station and defining a light path from the linear array of electric-to-light transducers to the exposure station; film handling means at the exposure station for supporting and disposing a strip of film, when present at the exposure station, for receiving the light produced by the linear array of electric-to-light transducers via the light path and drive means for moving the film past the exposure station for exposing the film to the light produced by the linear array of electric to light transducers in a line-by-line fashion.

In another embodiment, two linear arrays of electric-to-light transducers are used to provide light images line by line which are directed to separate side-by-side portions of a single film media. This, for example, is used to film front and back side images of a document using signals for the arrays produced from bit map format signals that were produced and stored from a scan made of the front and back images of a document.

BRIEF DESCRIPTION OF THE DRAWINGS

The features of the invention presented herein, which are referred to above and others, will become more apparent to those skilled in the art upon consideration of the following detailed description which refers to the accompanying drawings wherein:

FIG. 2 is a fragmentary longitudinal sectional view of the machine of FIG. 1;

FIG. 3 is a schematic view of the optical system of the machine between a light image source provided by a linear array of electric-to-light transducers and exposing station;

FIG. 4 is a schematic perspective view of the drive and mechanism control members of the machine of FIG. 1;

DETAILED DESCRIPTION

Figure 1:
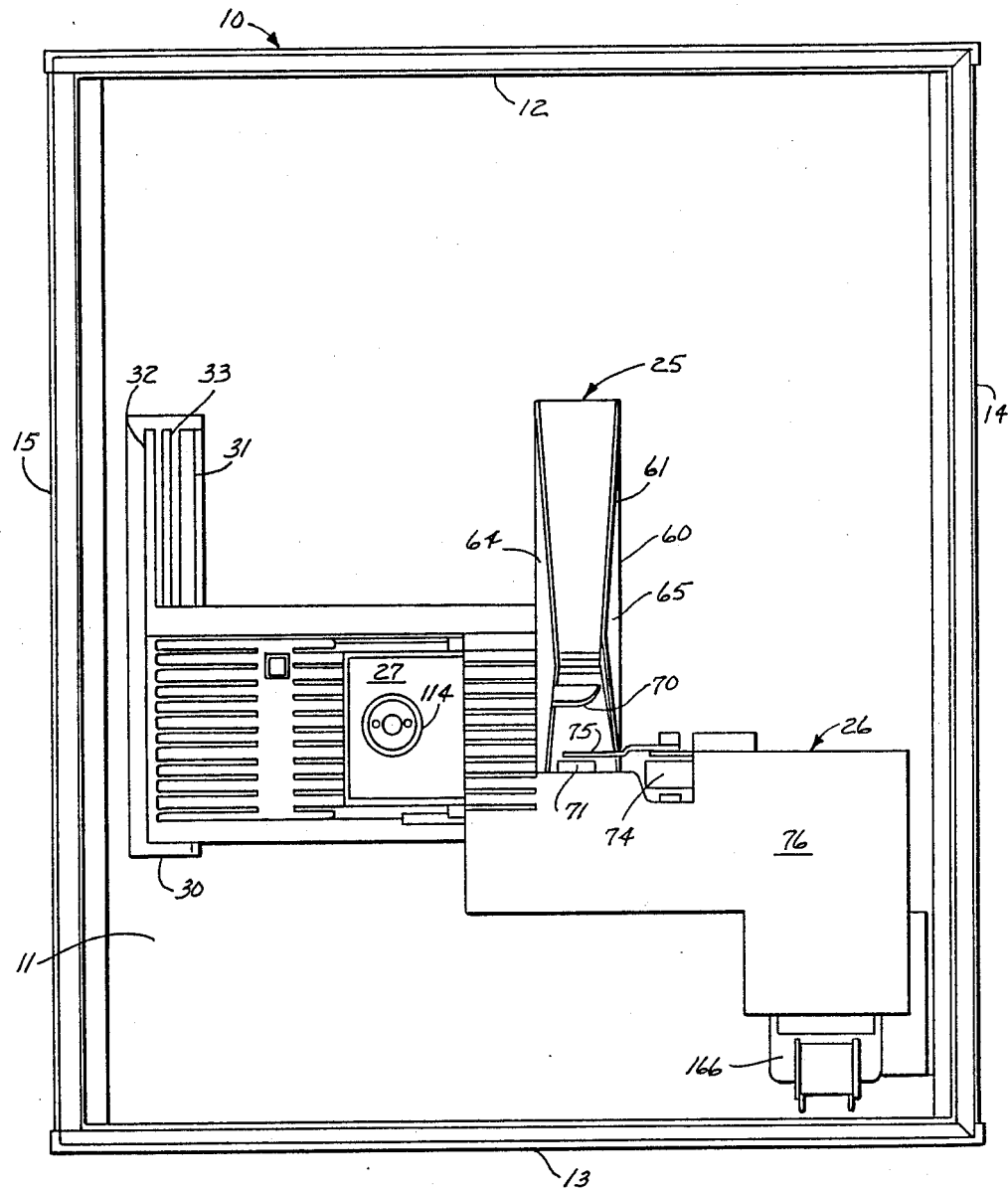
FIG. 1 is a plan view of a machine formed in accordance with the present invention, with a cover of the housing removed.

Referring now to the drawing, like reference numerals in the several views refer to identical parts. A camera 10 is shown in FIG. 1 which includes a housing having a base or mounting frame 11 for the camera elements, transversely spaced side walls 12 and 13, a rear wall 14, a front wall 15, and a cover (not shown). Supported by the frame 11 is a frame 30 on which a linear array of electric-to-light transducers 31, which can be an array of light emitting diodes (LED) or a liquid-crystal shutter (LCS) array, is mounted at the object plane of the camera. The frame 11 also carries two circuit boards 32, 33 having circuitry (not shown) for applying signals to the LED array 31 for turning the various LEDs on and off in accordance with digital signals supplied from a storage media (not shown) that is external to the camera 10. The storage media contains the digital signal information in a bit map format. The LED array 31 is assembled on a multilayer substrate along with direct drive integrated circuits for the LEDs. The frame 11 also supports a mirror supporting frame generally designated as 25 and a frame or housing 26 enclosing a film handling apparatus for the camera. The housing 26 has means defining a film cartridge receiving and supporting platform 27. The housing 26 is disposed adjacent the top of the camera 10.

Referring also to FIG. 2, the mirror supporting frame 25 has a generally triangular configuration with a base 60, secured to the frame 11, and angularly disposed converging upper members 61 and 62, having side plates 64 and 65 which serve to enclose a first mirror 66 and a second mirror 67. The plate 64 is formed with an opening 68 allowing mirror 66 to receive the light output from the LED array 31. The first mirror 66 is a planar elongated first surface mirror extending parallel to the LED array 31, but having its planar surface inclined 45 degrees to the vertical and inclined 45 degrees to the path of the light from the LED array 36. The second mirror 67 is also a planar first surface mirror and is disposed vertically above the first mirror 66 and is disposed in a plane oblique with respect to the axis or direction of extent of the first mirror 66. The second mirror 67 is positioned to receive light reflected from the first mirror 66 to reflect the light in a direction, the path of the light being in a plane, generally parallel to the axis of the first mirror and the LED array 31. After the light is reflected from the second mirror 67 the reflected image is directed through an opening 70 (FIG. 1) in the mirror housing 25, to an achromatic objective lens mounted in a barrel 71 at the exposure station, which will hereinafter be described. Mounting members for the mirrors 66 and 67 afford some adjustment to permit proper alignment of the light images to the axis of the lens. The plates 64 and 65 restrict the mirrors from reflecting or projecting stray light which might be present in the camera environment and thus reduce any unwanted reflections which could be superimposed upon the film on the desired image.

The housing 26 which supports the film-handling apparatus in which a film cartridge 77 is received, also supports a solenoid 74 which operates a shutter blade 75 positioned in front of the objective lens barrel 71. As viewed in FIG. 5, a top plate 76 of housing 26 is removed showing the interior of the housing and showing a film cartridge 77 which has its top plate removed to illustrate the interior of the cartridge. Cartridge 77 is also illustrated in FIG. 7.

The housing 26 is formed with guide members which extend from the cartridge-supporting platform 27 through form walls for the housing 26 defining a path toward a take-up reel 79 mounted in the housing. The guide members are designated by the reference numerals 81, 82, 83 and 84. These members generally constitute wall members in or for the housing 26. A film 89 may be automatically threaded along the path from a film supply cartridge 77, through the housing 26 between one end of the objective lens barrel 71 and a capstan 86 defining the image plane to the rotatably driven take-up reel 79. The guide members assure the movement of a leader 87 attached on the forward end of a strip of film 89 along a first path through the housing to a position between the reel flanges on the take-up reel 79. The take-up reel has at least one of the flanges spring-biased toward a minimum spaced position relative to the other flange. This structure serves to grasp a free end portion 88 of the leader, which portion has a greater width than said minimum spacing. The grasping of the leader affords winding engagement of the leader 87 and film 89 on the take-up reel 79. The take-up reel and its operation for automatic threading is disclosed and claimed in U.S. Pat. No. 3,149,797. When the leader is threaded the film is moved to a second film path which is more restricted as will hereinafter be described. Referring to the spring biased pressure rollers 122 and 123, the rollers are shown positioned away from the capstan 86 in FIG. 5. FIG. 6 shows the rollers 122 and 123 biased toward the capstan 86 to hold the film 89 in contact with the capstan 86.

Figure 5:
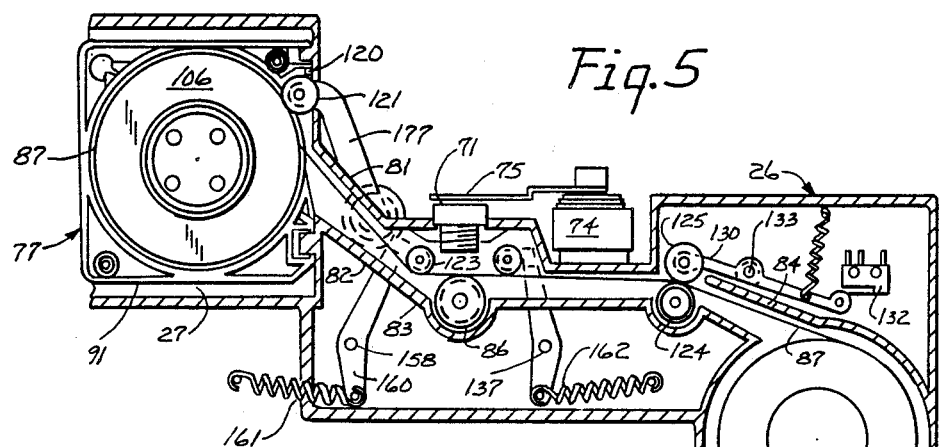
FIG. 5 is a fragmentary plan view of the film handling means of the machine.
Figure 6:
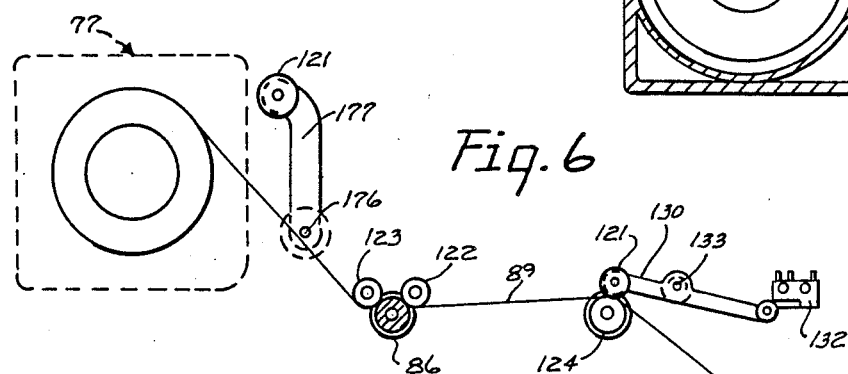
FIG. 6 is a schematic view showing the film handling means of FIG. 5.
Figure 7:
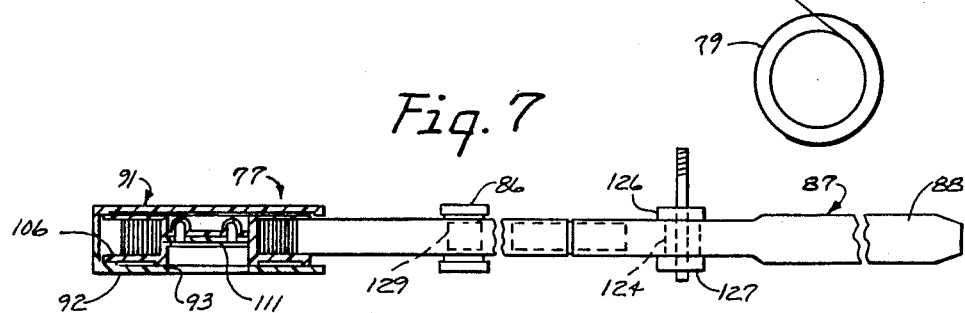
FIG. 7 is a detailed view showing the film supply cartridge, film and leader and an elevation view of the film drive capstan and drive member for the counter.

The film cartridge 77, as well as the other film handling elements, shown in FIGS. 5-7, are known and are described in further detail in U.S. Pat. No. 3,539,257. The film cartridge 77 and the film handling elements shown FIGS. 5-7 are merely representative of film cartridge and film handling elements that are usable as a part of the camera embodying the invention for providing passage of the film 89 from a supply reel past an image plane to a take-up reel. Other known film cartridge and film handling elements can be employed to carry out this function.

Figure 8:
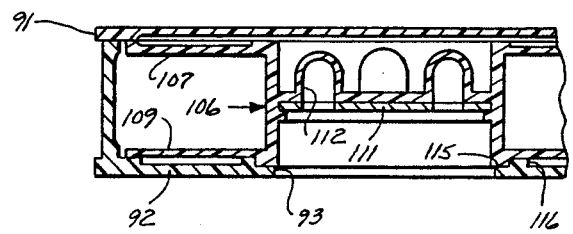
FIG. 8 is a fragmentary sectional view of the film cartridge.

Referring now to the film cartridge 77, it comprises a box-like container 91 in which a film supply reel 106 is rotatably positioned. The reel 106 comprises spaced parallel side flanges 107 and 109 joined by a hub 110 having a central supporting ferrous metal disk 111 formed with socket-like members 112. The members 11 are adapted to receive projections 113 on a drive spindle 114 (FIG. 2) extending through the cartridge support platform 27. As shown most clearly in FIG. 8, the hub 110 has an axial projection 115 which fits within a circular ring 116 on the inner side of bottom plate 92 adjacent the aperture 93. The projection 115 and ring 116 form a labyrinth seal preventing light from entering the cartridge. The film 89 is secured to the hub by a trailer and is wound on the reel 106 with the light-sensitive emulsion side of the film on the outer surface. The leader 87 is attached to the free end of the film and, a shown in FIG. 7, the leader 87 has a portion which is as wide as the film and the portion 88 of greater width than the film 89. This portion of greater width is wound on the outer peripheral surfaces of the flanges 107 and 109 and is accommodated within the cavity defined by tee actuate wall members. The leader is formed of an opaque material and protects the film from the light when wound within the cartridge as it has a length sufficient to make several wraps about the reel. The flanges and hub of the reel 106 and the cartridge are also formed of opaque material.

The cartridge 77 has an opening 119 through which the leader and film may pass as it is pushed and withdrawn from the cartridge by the film transport past the exposure station. An opening 120 in wall 97 of container 91 can receive a driven roller 121, which roller can frictionally contact the wide portion 88 of the leader 87 and move the leader 87 in an unwinding direction to push the free end of the leader to the opening 119 at which it will be free to move out of the cartridge into the guide channels defined by guides 81 and 82.

As the leader is pushed along the guide path, as illustrated in FIG. 5, from the supply reel 106 toward the take-up reel 79 it passes between two movable spring-biased pressure rollers 122 and 123 and the capstan 86. The capstan 86 is a single roller formed with axially stepped surfaces, each having a different diameter. When the narrow portion of the leader 87 or the narrower film 89 is positioned at the capstan it can be moved, under the influence of the pressure rollers 122 and 123, from a first path adjacent the larger diameter axially spaced portions to a second path to engage an inner cylindrical portion 129 of the capstan 86 defining the image plane and having a smaller diameter and greater length than the other portions. In this position the larger diameter portions guides the film to position it in proper relationship with the axis of the objective lens.

As the leader and film move between the capstan 86 and the take-up reel 79 it also moves between two axially spaced rollers 126 an 127, which are rotatably mounted above and below a driving element or capstan 124 which drives a pressure roller 125. After the wide portion 88 of leader 89 passes the axially spaced rollers, the pressure roller 125 forces the trailing portion of the leader and the film into driving position against the roller 124. The pressure roller 125 is mounted at one end of a lever 130 which is biased by a spring 131 in a direction to move the roller 125 against the capstan 124. When the narrower portion of the leader asses between these two members the spring causes the lever 130 to move about its pivot point or fulcrum 133 and the opposite end of the lever engages a switch blade closing a switch 132 to indicate the completion of threading and actuate a further function of the machine. The next function is to move the film 89 from the first threading path to the operative second path filming position against the smaller portion 129 of the driven capstan 86, as discussed above, and to withdraw the drive roller 121 from the opening 120 in he cartridge. These movements are accomplished by cams and cam followers, as will be described hereinafter.

The drive system for the camera is illustrated schematically in FIG. 4. The motor 36 drives a pulley 135 operatively connected thereto. The pulley 135 drives a timing belt 136 extending from the pulley 135 to a pulley 137 supported on an input hub of a one-way electrically operated spring clutch 140. When the clutch 140 is energized, the driven pulley 137 causes rotation of an output shaft 141, which via crossed helical gears 142 and 144, rotates a shaft 145 supporting the capstan 86. Positioned beneath the shaft 145 is a coaxial shaft 147 driven from the shaft 145 via a second electrically operated clutch 146. Three cams 149, 150 and 151 are supported on and are driven by the shaft 147. The three cams control the position of three associated followers 153, 154 and 155, respectively. The followers 154 and 155 serve to rotate shafts 157 and 158 secured to crank arms 159 and 160 upon which are mounted the pressure rollers 122 and 123. Thus in one position of the cams 150 and 151 the pressure rollers 122 an 123 are permitted to move against the capstan 86 under the bias of springs 161 and 162 to hold the film in contacting driving engagement with the portion 129 thereof. The rollers 122 and 123 hold the film in the image plane defined by portion 129 of the capstan such that images may be imparted to the film. In another position of the cams the pressure rollers 122 and 123 are moved away from the capstan 86 by the followers 154 and 155 against the bias of the springs 161 and 162, and cam 149 and follower 153 permit the movement of the roller 121, under the bias of a spring, into drive-out leader threading position. In still another position, the rollers 122 and 123 are retracted and roller 121 is retracted, permitting a free path for rewinding of the film and leader back into the cartridge 77.

The rewinding operation is afforded by a motor 165 connected directly to the spindle drive 114. The take-up reel 79 is driven by a motor 166 through a shaft 167. Also mounted on the shaft 167, however, is a pulley 169 around which extends a drive belt 170 serving to drive a double pulley 171 by contact with one periphery thereof during its movement between the pulley 169 and a spaced pulley 172. A second belt 174 is entrained around the pulley 171 and another double pulley 175 which is rotatably mounted on a shaft 176 supporting the cam follower 153 A crank arm 177 (FIG. 5) is secured to the shaft 176 such that upon rotation of the shaft under the influence of the follower 153 the roller 121 is moved into the opening 120 or is retracted therefrom. A third drive belt 179 in this series is driven by pulley 175 and drives the roller 121 through a pulley 180 and drive shaft 181 in a direction to push the leader in an unwinding direction to drive the leader out of the opening 119. As explained above, cams 149, 150 and 151 have cam surfaces which, in one position permit retraction of rollers 122 and 123 and insertion of roller 121 to thread the film, in another position release of the rollers 122 and 123 and retraction of roller 121, and further, retraction of all those rollers during film rewind.

In operation the operator places a cartridge 77 on the supporting platform 27 of the camera with the hub disk 111 of the cartridge mounted on the spindle 114. The operator then pushes appropriate operating buttons (not shown) to commence the threading operation. The motor 166 for the take-up reel is energized during belts 170, 174, and 179 to drive the roller 121. The motor 36 drives the pulley 137 such that upon operation of the solenoid clutch 140 and clutch 146, power is provided to the cam shaft 147 to rotate the cams moving the roller 121 into the opening 120 and holding rollers 122 and 123 retracted as shown in FIG. 5. The clutch 146 is then de-energized and the leader is driven from the cartridge through the guide path toward the take-up reel 79. After the wide portion 88 of the leader passes between the capstan 124 and the pressure roller 125, switch 132 closes to stop the motor 166, and to energize the clutches 140 and 146 to rotate cam shaft 147 through another step to withdraw the roller 121 and permit movement of the pressure rollers 122 and 123 against the film 89 urging it into engagement with the reduced portion 129 of the capstan 86. The solenoid clutches 14 and 146 would then be disengaged. Assuming an image in bit map form is available for an input to the LED array 31, the operator then operates an appropriate switch (not shown), which is effective to initiate the flow of bit map information to the LED array 31 following energization of the rotary solenoid 74 to move the shutter blade 75 to an open position with respect to the lens barrel 71. At the same time, the motor 166 is energized to turn the take-up reel, and the solenoid clutch 140 is energized to rotate the capstan 86.

The LED array 31 is operated in accordance with the bit map information that is supplied to the camera from an outside source to expose the film presented at the capstan 86 on a line-by-line base. The exposure of the film to the LED array output occurs while the film is moving. The exposure can be carried out in about the time it takes the film to move one-tenth of a line (the exposure width at the film presented by the light from the LEDs) so a blurring problem is not presented by the film movement. An encoder or line sensing means 5 that includes an encoder wheel 6 connected for rotation by the motor 36 and an encoder wheel sensing device 7 is used to coordinate the supply of each line of bit map information to the LED array 31 relative to the movement of the film 89. Being driven by the motor 36, the position of the encoder wheel 6 is related to the position of the film and serves to supply a signal each time the film has moved a distance sufficient for the LED array 31 to be operated to provide a new line image to the film. The encoder wheel sensing device 7 is of a known type wherein a U-shaped support structure is provided for positioning a light source, such as an LED, in one leg of the support which has its light directed toward a light-to-electric transducer, such as a phototransistor, positioned in the other leg of the support. The encoder wheel sensing device 7 is positioned to straddle the encoder wheel 6 which is formed with radially extending, equally spaced slits, indicated by the line 8 on the wheel 6. The spacing between the slits determines the line resolution that is provided at the film. Each slit 8 will be presented as the wheel 6 rotates the allow light to pass from the LED in one leg of the device 7 to the transducer in the other leg of the device 7 to thus provide a signal for each slit as they are presented which is used to signal the supply of data for a line o control the operation of the various LEDs in the array 31. In this manner the film is exposed on a line-by-line basis to expose the film in accordance with bit map image signals.

Switch means (not shown) are provided on the counter 72 driven by the capstan 124 such that when a predetermined length of film has been withdrawn from the supply reel 106, the machine will sop. The switch means on the counter comprises small cams or projections on the counter wheels adjacent certain numbers such that when the desired sequence appears at the counter window (indicating a predetermined number of frames or length of film has moved past the capstan 86) switch contacts adjacent the counter wheels will be closed to discontinue operation, energize a visual or audible alarm, or actuate the camera for a further automatic function. If the machine mode is automatic the clutches 140 and 146 are energized to index the cams and open the path for rewinding and energizes the motor 165. If not automatic, the switch means may light an indicator lamp on the panel such that the operator will commence the rewind by appropriate action. Upon completion of the rewinding, sensed also by the switch 132, the motor 165 will be de-energized, after a predetermined delay to allow rewinding of the leader, and then stop the machine.

There are document scanning arrangements providing for line-by-line scan of the images on the front and back sides of a document at the same time for storage of the scanned images in a bit map format using a magnetic or optical disc storage media. Since such documents normally contain information to be considered in a sequential manner, a page buffer is used to delay the storage of the bit map image for one of the two sides of the document to provide for sequential storage of the images using the same storage media.

Figure 9:
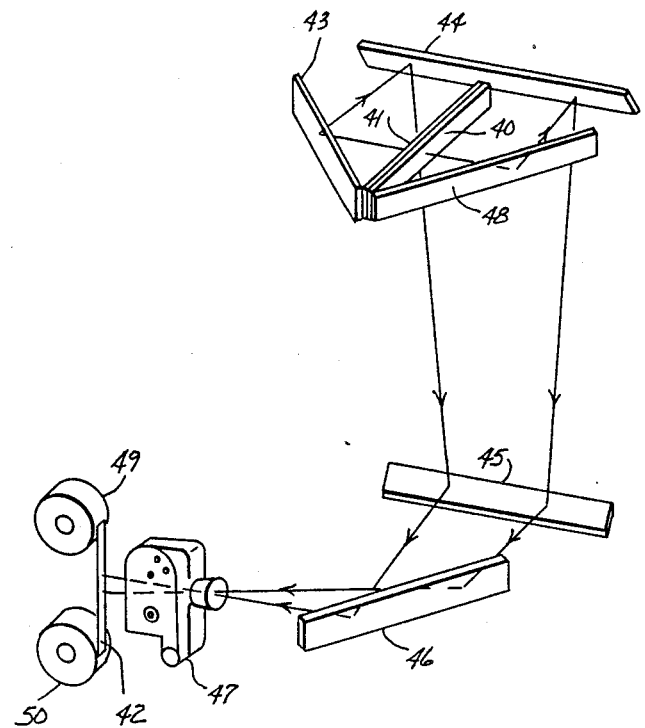
FIG. 9 is a schematic showing of another embodiment of the invention wherein two linear arrays of electric-to-light transducers are used with each light image produced by the arrays that are directed to separate portions of a film presented at the image plane.

An embodiment of the present invention appears in FIG. 9 wherein apparatus positioned within a housing (not shown) includes two linear LED arrays 4 and 41, the output of which is directed to separate, side-by-side halves of an image plane at which film 42 is presented for receiving the output of the LED arrays output as the film is moved transversely to the line images provided by the output of the LED arrays. The light images provided by the LED arrays 40 and 41 are directed to a number of first surface mirrors 43–46 positioned to present the light images to lens unit 47 which focuses the light images at the film 42. The light images provided by the LED arrays 40 and 41 are initially directed to a first surface mirror 48 when it reflected for passage to mirror 44 and thence to mirrors 45 and 46. Mirrors 44, 45 and 46 merely serve to fold the light path so that the other elements can be conveniently positioned within a light tight housing (not shown). If compactness and other space considerations were not a factor, mirrors 44–46 could be eliminated with the light images from LED arrays 40 and 41 that is reflected from mirrors 48 and 43, respectively, passing directly to the lens unit 47. This arrangement described requires the use of page buffers with one of the LED arrays 40 and 41 so two pages or images in bit map form can be obtained from storage where they have been sequentially stored to enable both images to be presented line by line and in side-by-side relation on a portion of the film 42 as the film is moved from a supply reel 49 to a take-up reel 50 by a drive mechanism (not shown).

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

We claim:
1. Camera apparatus including:
   a housing;
   a linear array of electric-to-light transducers within the housing at the object plane of the camera;
   means within the housing defining an exposure station and defining a single light path for the passage of light from said linear array to said exposure station for providing a full film width exposure of the light from said linear array at said exposure station;
   film handling means at said exposure stations for supporting and disposing a strip of film, when present at said exposure station, for receiving the light produced by said linear array via said path; and
   drive means for moving the strip of film past said exposure station for exposure of the film when light is produced by said linear array.
2. Camera apparatus according to claim 1 wherein said linear array is an LED or LCS array.
3. Camera apparatus including:
   a housing;
   two linear arrays of electric-to-light transducers within said housing for producing light images;
   means within the housing defining an exposure station and defining a separate light path for each of said linear arrays to said exposure station directing light images produced by said two arrays so they are presented side-by-side and simultaneously at said exposure station said means including a lens unit and at least one mirror that are common to the separate light paths;
   film handling means at said exposure station for supporting and disposing a strip of film, when present at said exposure station, for receiving the light images produced by said two arrays; and
   drive means for moving the strip of film past said exposure station when light is produced by said linear arrays to produce two side-by-side exposures of the film.
4. Camera apparatus according to claim 3 wherein said linear arrays are LED or LCS arrays.

* * * * *

UNITED STATES PATENT AND TRADEMARK OFFICE
CERTIFICATE OF CORRECTION

PATENT NO. : 4,912,488
DATED : March 27, 1990
INVENTOR(S) : Robert S. Berglund and Earl K. Hoyne It is certified that error appears in the above-identified patent and that said Letters Patent is hereby corrected as shown below:

```
Col. 1, Line 8, "articular," should read -- particular, --.
Col. 3, Line 65, "11" should read -- 112 --.
Col. 4, Line 8, "a shown" should read -- as shown --.
Col. 4, Line 13 & 14, "tee actuate" should read -- the
arcuate --.
Col. 4, Line 58, "asses" should read -- passes --.
Col. 6, Line 14, "14" should read -- 140 --.
Col. 6, Line 59, "0 control" should read -- to control --.
Col. 6, Line 67, "sop" should read -- stop --.
Col. 7, Line 30, "4 and 41" should read -- 40 and 41 --.
Col. 8, Line 23, "stations" should read -- station --.
```

Signed and Sealed this

Fourteenth Day of December, 1993

*Attest:*

BRUCE LEHMAN

*Attesting Officer*      *Commissioner of Patents and Trademarks*